United States Patent
Krueger

[11] Patent Number: 5,193,304
[45] Date of Patent: Mar. 16, 1993

[54] PLANT POT CARRYING METHOD AND CARRIER

[76] Inventor: Anette G. Krueger, 199 King Street, St. Jacobs, Ontario, Canada, N0B 2N0

[21] Appl. No.: 589,406

[22] Filed: Sep. 28, 1990

[51] Int. Cl.$^5$ ............................................. A01G 9/02
[52] U.S. Cl. ......................................... 47/67; 248/315
[58] Field of Search ............ 47/66, 67, 72, 24; 248/682, 689, 315, 311.3; 220/94 R, 96, 94 A

[56] References Cited

U.S. PATENT DOCUMENTS

| | | | |
|---|---|---|---|
| 98,291 | 12/1869 | Nashold | 220/96 |
| 1,006,513 | 10/1911 | Tyreman | 248/315 |
| 1,369,965 | 3/1921 | Comstock | 47/67 |
| 1,756,461 | 4/1930 | Hanson | 47/67 |
| 3,402,910 | 9/1968 | Purvis | 248/311.3 |
| 3,482,867 | 12/1969 | Allen | 220/94 R |
| 3,709,544 | 1/1973 | Oltmanns | 220/94 R |
| 4,269,322 | 5/1981 | Larson | 220/94 R |
| 4,357,042 | 11/1982 | Gall | 220/94 R |
| 4,691,473 | 9/1987 | Ragen | 47/67 |
| 4,825,590 | 5/1989 | Cullinane | 47/67 |

FOREIGN PATENT DOCUMENTS 910263  9/1972  Canada ................................... 47/24

*Primary Examiner*—David A. Scherbel
*Assistant Examiner*—Michele A. Van Patten
*Attorney, Agent, or Firm*—R. Craig Armstrong

[57] ABSTRACT

A plant pot carrier is provided, generally in the form of a ring of lesser diameter than the top of the pot, to support the pot. Preferably, the ring is circular in cross-section and nearly cylindrical but tapered slightly to match the taper of the upper rim of a plant pot. In the preferred embodiment, leading from opposite upper sides of the ring are two flexible straps, which may be bent upwardly to meet each other and which include complimentary means for fastening one to the other, thereby forming a loop which can be used as a carrying handle. At least the lower periphery of the ring includes several inwardly directed tabs or a continuous flange which engages the underside of the lip commonly formed by the annular ring at the top of a typical plant pot. Preferably, several spaced tabs or a continuous flange are also provided at the upper margin of the ring, to engage the upper portion of the plant pot. In an alternative embodiment, instead of there being two straps on opposite sides of the ring, there is one long strap on one side of the ring, fastenable to the opposite side of the ring. The method of the invention involves positioning one of the rings horizontally, placing a plant pot is placed within the perimeter of the ring, engaging the ring with the pot, and then forming the carrying handle from the strap or straps.

18 Claims, 6 Drawing Sheets

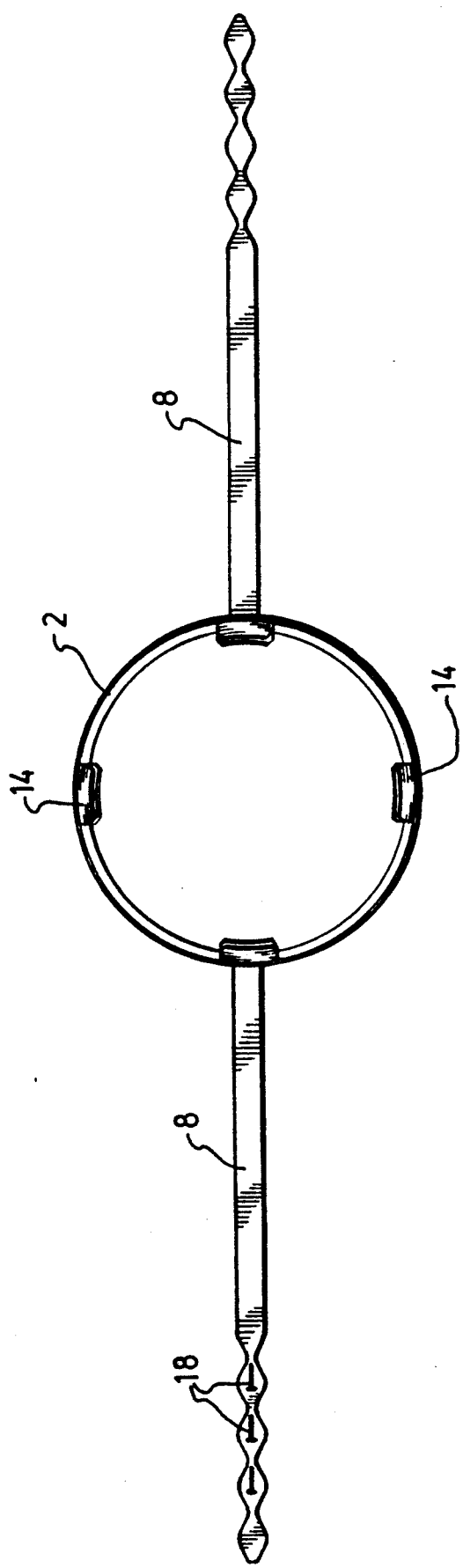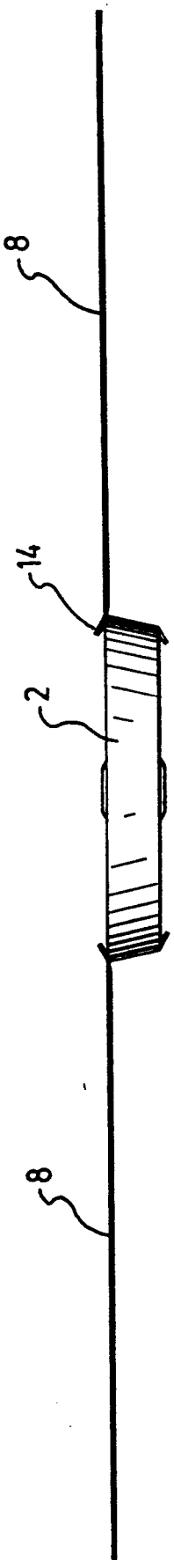
FIG. 3.
FIG. 4.

PLANT POT CARRYING METHOD AND CARRIER

BACKGROUND OF THE INVENTION

2. Field of the Invention

This invention relates to a method of transporting individual plant pots, and to a plant pot carrier for use in implementing the method.

2. Description of the Prior Art

When potted plants are purchased, it is a common practice to place the pot on a stand, and draw a tapered paper wrapper over the plant pot from below, then closing it over the plant. In order to carry the plant and the plant pot, it is necessary to grasp the paper wrapper and attempt to carry the plant pot by holding the paper wrapper.

In the case of hanging plants, the pot is typically provided with three holes on the upper lip thereof, spaced 120 degrees apart. A hanging hook, which doubles as a carrying handle, has three wires leading from it, and the three wires are hooked to the lip of the pot, one in each hole.

However, there is generally no convenient method or apparatus at present for transporting potted plants.

SUMMARY OF THE INVENTION

It is an object of the present invention to provide a method of transporting individual potted plants, and to provide a carrier which can be used to implement the method.

In accordance with the invention, the carrier is in the form of a ring having an inner diameter less than the diameter near the top of the plant pot and greater than the diameter below near the top. There is at least one strap integral with the ring, the strap(s) being securable to define a single carrying handle looping from one side of the ring, thence upwardly, across and down to the opposite side of the ring.

In its preferred embodiment, the carrier is generally in the form of a ring which is circular in cross-section and nearly cylindrical but tapered slightly to match the taper of the upper rim of a plant pot. Leading from opposite upper sides of the ring are two flexible straps, which may be bent upwardly to meet each other and which include complimentary means for fastening one to the other, thereby forming the loop which can be used as a carrying handle. At least the lower periphery of the ring includes several tabs or a continuous tab portion which engages the underside of the lip commonly formed by the annular ring portion at the top of a typical plant pot. Preferably, several spaced tabs or a continuous tab are also provided at the upper margin of the ring, to engage the upper portion of the plant pot, so that once the carrier is installed on the plant pot, it cannot subsequently slip down off the plant pot inadvertently. All of the tabs are inwardly directed.

In an alternative embodiment, instead of there being two straps on opposite sides of the ring, there is one long strap on one side of the ring, including means which are complimentary to other means on the ring on the side opposite the strap, such that the strap may be looped over the top of the ring, and fastened to the opposite side to create the desired handle.

In every case, it is preferable that the size of the handle may be adjusted, by providing for the above mentioned complimentary means to be fastenable at various positions.

In accordance with the method of the present invention, one of the rings is positioned horizontally, and a plant pot is placed within the perimeter of the ring. The plant pot is then dropped down into the ring, or the ring is lifted up around the plant pot, until the ring is properly positioned to support the plant pot. The strap or straps is/are then connected in order to form the handle above the plant pot.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 3 is a top view of the preferred embodiment;

FIG. 4 is a side view of the preferred embodiment;

DETAILED DESCRIPTION OF THE PREFERRED EMBODIMENT

Figure 12:
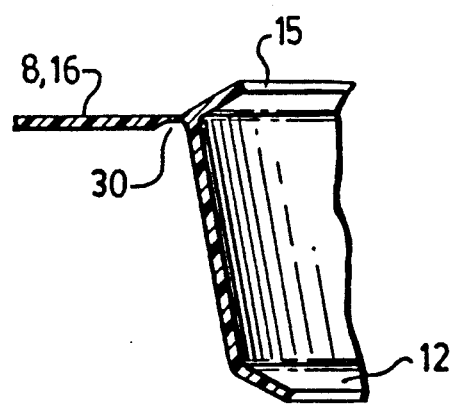
FIG. 12 is a side sectional view of the area of the ring/strap junction in an alternative embodiment.
Figure 13:
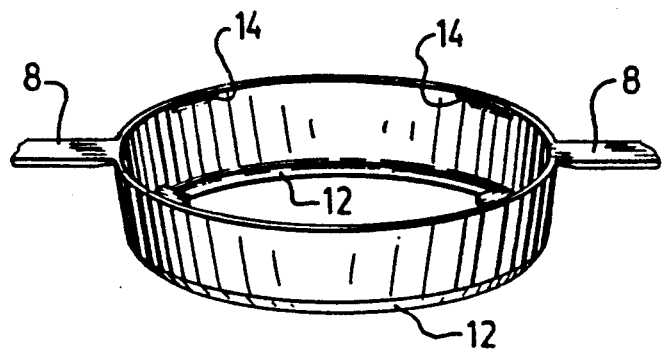
FIG. 13 is a perspective of another alternative ring configuration.

The preferred embodiment of the carrier 1 is generally in the form of a ring 2 which is circular in cross-section and nearly cylindrical but tapered slightly to match the taper of the upper rim 4 of a conventional plant pot 6. In the preferred embodiment, illustrated in FIGS. 1–4, leading from opposite upper sides of the ring 2 are two flexible straps 8, which may be bent upwardly to meet each other and which include complimentary means for fastening one to the other, thereby forming a loop which can be used as a carrying handle. At least the lower periphery of the ring includes several inwardly directed tabs 10 or a continuous flange 12 as illustrated in FIGS. 12 and 13 which engages the underside of the lip commonly formed by the annular ring portion 4 at the top of a typical plant pot. Preferably, several spaced inwardly directed tabs 14 or a continuous flange 15 are also provided at the upper margin of the ring, to engage the upper surface of the plant pot rim, so that once the carrier is installed on the plant pot, it cannot subsequently slip down off the plant pot inadvertently.

In an alternative embodiment, illustrated in FIGS. 5–8, instead of there being two straps 8 on opposite sides of the ring 2, there is one long strap 16 on one side of the ring, including means which are complimentary to other means on the ring on the side opposite the strap, such that the strap may be looped over the top of the ring, and fastened to the opposite side to create the desired handle.

In every case, it is preferable that the size of the handle may be adjusted, by providing for the above mentioned complimentary means to be fastenable at various positions.

It should be appreciated that the strap could be connected to the other strap, or to the opposite side of the ring, as the case may be, by any number of suitable fastening means.

Figure 1:
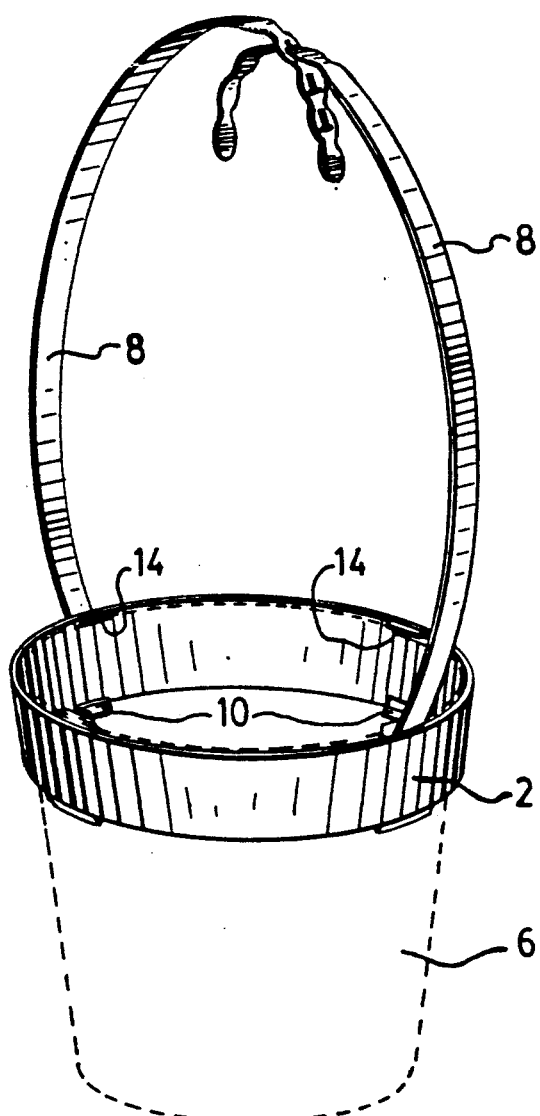
FIG. 1 is a perspective showing the preferred embodiment of the invention.
Figure 5:
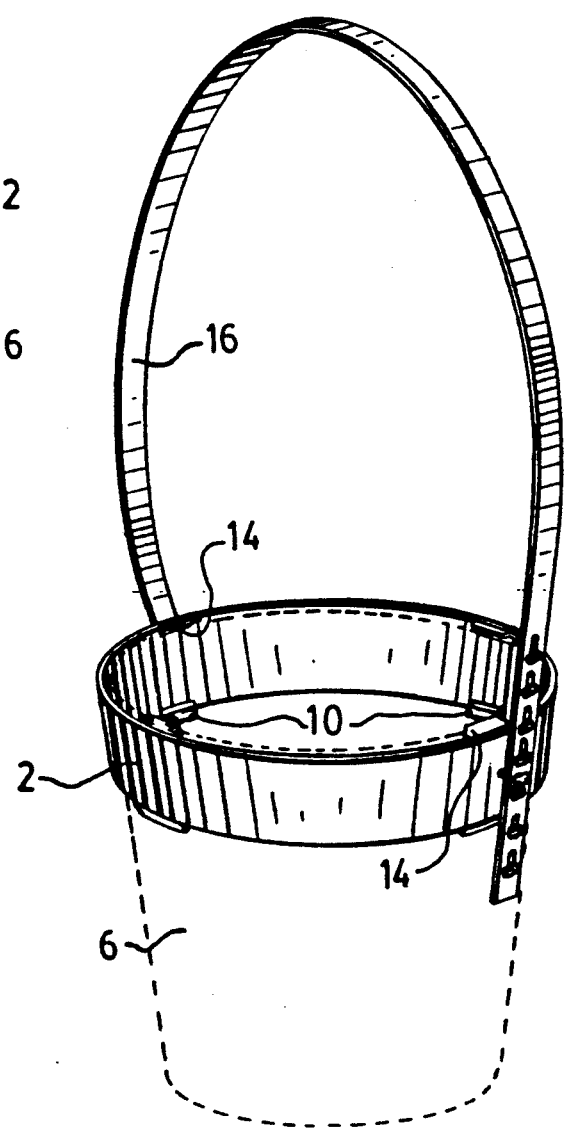
FIG. 5 is a perspective showing an alternative embodiment of the invention.
Figure 2:
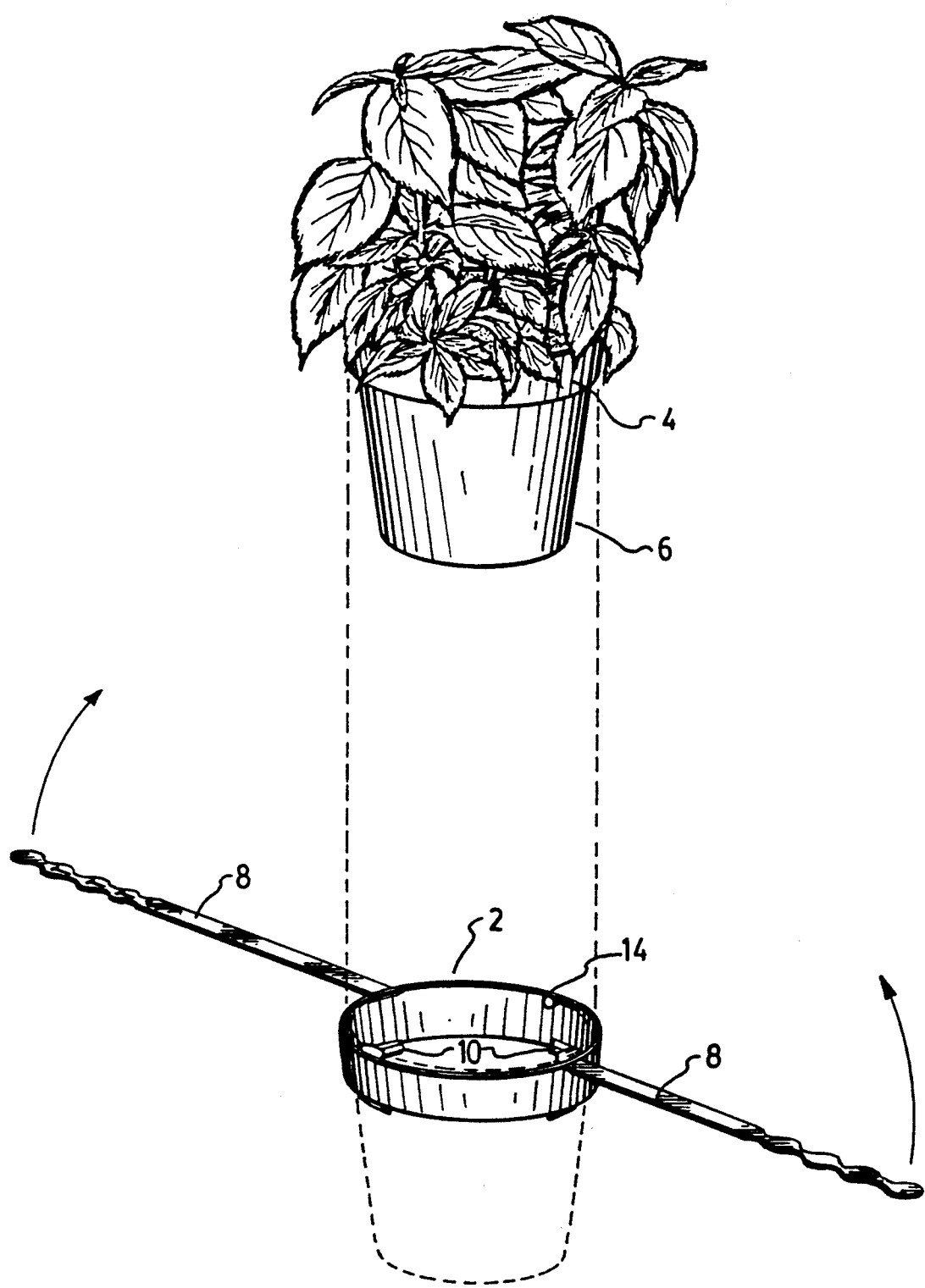
FIG. 2 is a perspective showing the preferred embodiment prior to positioning around a conventional plant pot.
Figure 6:
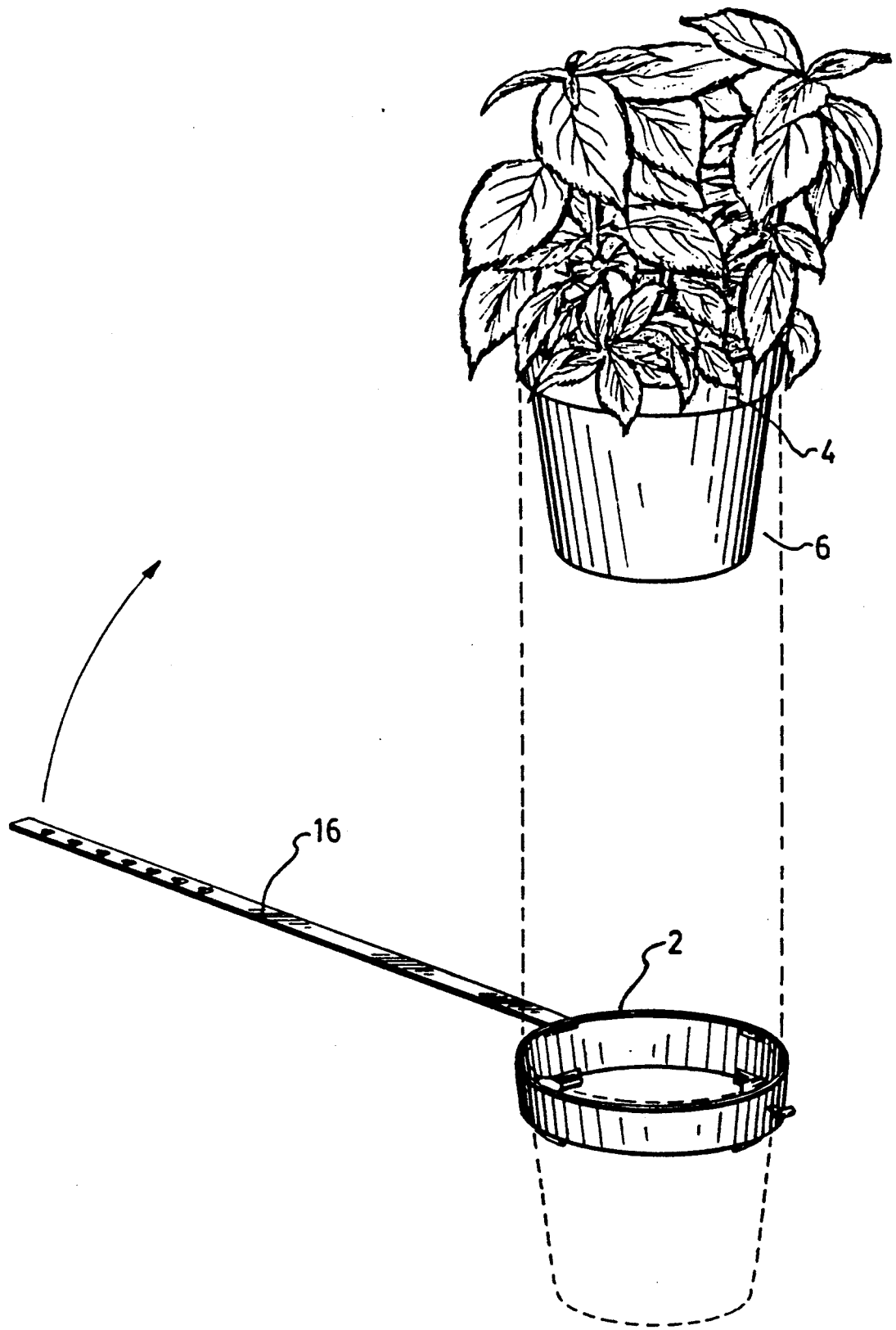
FIG. 6 is a perspective showing the alternative embodiment prior to positioning around a conventional plant pot.
Figure 7:
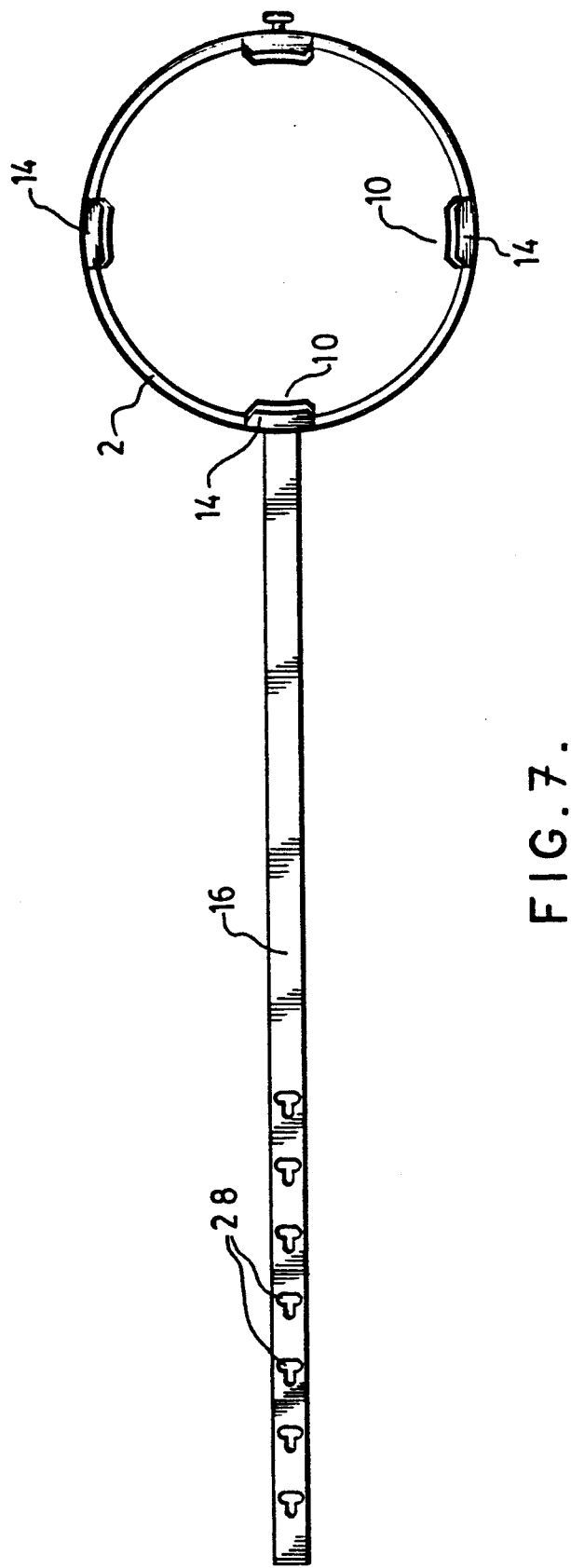
FIG. 7 is a top view of the alternative embodiment.
Figure 8:
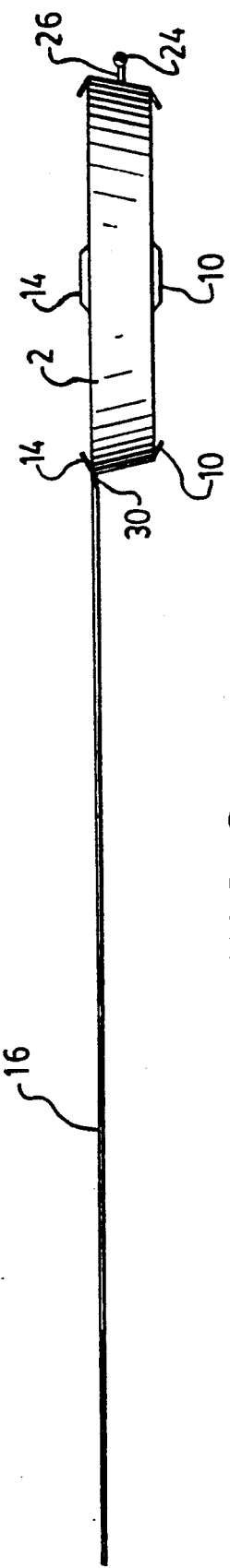
FIG. 8 is a side view of the alternative embodiment.
Figure 9:
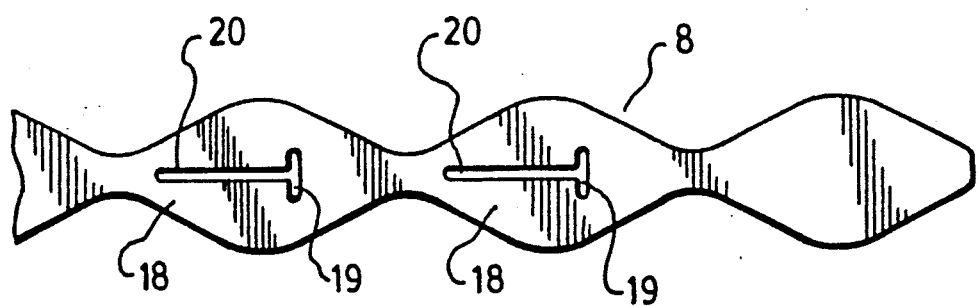
FIG. 9 is a detail view of the female strap of the preferred embodiment.
Figure 10:
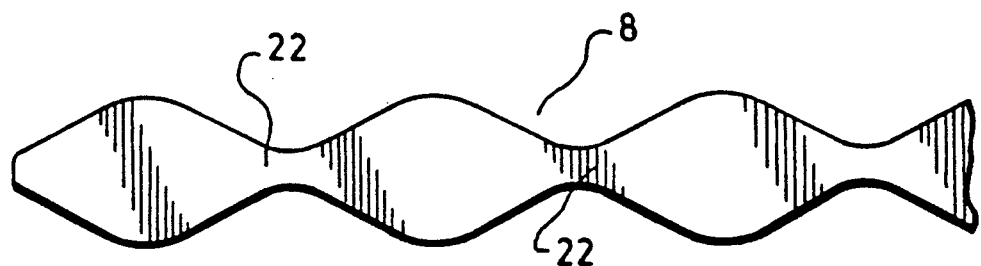
FIG. 10 is a detail view of the male strap of the preferred embodiment.
Figure 11:
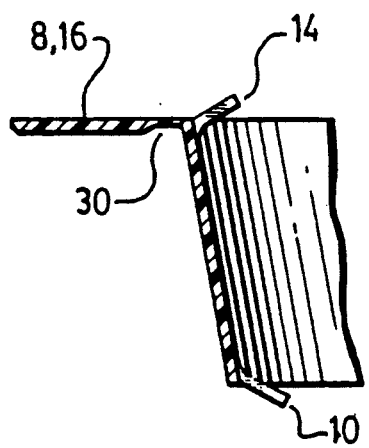
FIG. 11 is a side sectional view of the area of the ring/strap junction.

In the preferred embodiment, the two straps are fastenable to each other at a various positions by virtue of one of the straps having a plurality of T-shaped apertures 18 comprising a transverse top portion 19 and a longer base portion 20, as best seen in FIG. 9. The other strap, as best seen in FIG. 10, has at least one neck area 22 narrower than adjacent areas of the strap. The latter strap is insertable in the base portion of one of the T-shaped apertures, and it can then be rotated to position one of the neck areas in the transverse top portion of one of the apertures. The width of the strap adjacent the neck area is greater than the dimension of the transverse top portion of the aperture, so that the second strap anchors in the first strap.

In the alternative embodiment of the invention, i.e. where there is a single strap looping across to the opposite side of the ring, the preferred structure is for the opposite side of the ring to be provided with an ovaloid button 24 set out from the ring by a short cylindrical portion 26, with the strap being provided with a series of T-shaped apertures 28, spaced apart at different positions.

In the method of the invention, one of the rings is positioned horizontally, and a plant pot is placed within the perimeter of the ring. The plant pot is then dropped down into the ring, or the ring is lifted up around the plant pot, until the ring is properly positioned, i.e. with the tabs at the lower margin thereof engaging the underside of the lip formed underneath the annular upper portion of the plant pot. The strap or straps is/are then connected in order to form the handle above the plant pot.

In the preferred embodiment, there are four tabs at the lower margin. However, it should be appreciated that there obviously could be as few as two tabs, located on opposite sides of the ring, or there could be three, four or more tabs, spaced as desired. Alternatively, provided that sufficient flexibility was provided, there could be a continuous tab or flange provided.

The straps are preferably adapted to lie ordinarily in the plane of the ring, primarily for convenience of shipping and handling. Each strap is preferably connected to the ring via an integral "living hinge" comprising an area of reduced thickness 30 immediately adjacent the junction between the straps and the ring, so that the straps are readily deformable to form the carrying handle.

In the preferred embodiment, the material of choice will likely be polypropylene, probably in the range of 0.025 to 0.030 inches thick, except in the area of the living hinge, where the thickness will be reduced to probably about 0.005 to 0.006 inches.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, it should be clearly understood that the invention in its broadest sense can be used on plant pots which have a greater upper diameter than lower diameter, but which do not necessarily have the conventional upper rim which projects outwardly. All that is necessary in such a case is that the ring have an inner diameter less than the diameter near the top of the plant pot and greater than the diameter below near the top.

Furthermore, it should be apparent that the exact handle configurations disclosed above need not be employed. They are examples only. The essence of the invention resides in the overall method of carrying the plant pot, and in the device which permits the implementation of that method.

What is claimed as the invention is:

1. For use with a plant pot of circular cross-section having a tapering upper rim area with upper and lower margins, said upper rim area of said lower margin thereof having a greater diameter than below said upper rim area, a plant pot carrier comprising a ring defined by a generally vertical but slightly tapered wall with upper and lower edges, said ring at said lower edge thereof having an inner diameter less than said diameter of said upper rim area of the plant pot above said lower margin and greater than said diameter of said plant pot below said upper rim area, said ring at said upper edge thereof having an inner diameter greater than said diameter of said lower margin of said upper rim area and not less than the diameter of said upper margin of said upper rim area, and at least one strap integral with said ring, said at least one strap being securable to define a single carrying handle looping from a first location on one side of said ring, thence upwardly, across and down to a second location 180° degrees from said first location, i.e. on the opposite side of said ring.

2. A plant pot carrier as recited in claim 1, in which said at least one strap comprises two straps projecting from opposite sides of said ring, said two straps having complementary fastening means for fastening to each other to form said carrying handle.

3. A plant pot carrier as recited in claim 2, in which a first one of said two straps has a plurality of T-shaped apertures comprising a transverse top portion and a longer base portion, and in which the second one of said two straps has at least one neck area narrower than adjacent areas of said strap, where said second one of said two straps is insertable in said base portion of one of said T-shaped apertures, and is rotatable so as to position one of said at least one neck areas in said transverse top portion thereof, said strap adjacent said neck area being greater in width than said transverse top portion of said T-shaped aperture, whereby said second one of said two straps is anchorable in said first one of said two straps.

4. A plant pot carrier as recited in claim 2, in which said two straps are adapted to lie ordinarily in the same plane as said ring, but are each connected to said ring via an integral living hinge comprising an area of reduced strap thickness immediately adjacent junctions between said two straps and said ring, whereby said two straps are readily deformable to form said carrying handle.

5. A plant pot carrier as recited in claim 3, in which said two straps are adapted to lie ordinarily in the same plane as said ring, but are each connected to said ring via an integral living hinge comprising an area of reduced strap thickness immediately adjacent junctions between said two straps and said ring, whereby said two straps are readily deformable to form said carrying handle.

6. A plant pot carrier as recited in claim 1, in which said at least one strap comprises a single strap projecting from a first location on said ring, passable across to and fastenable at a second location on said ring 180 degrees from said first location to form said carrying handle.

7. A plant pot carrier as recited in claim 6, in which said one strap is adapted to lie ordinarily in the plane of said ring, but is connected to said ring via an integral living hinge comprising an area of reduced strap thickness immediately adjacent a junction between said strap and said ring, whereby said strap is readily deformable to form said carrying handle.

8. For use with a plant pot of circular cross-section and having an outwardly-projecting annular upper rim, a plant pot carrier comprising a ring defined by a generally vertical but slightly tapered wall with upper and lower edges, having integral inwardly directed flange means projecting from said lower edge for engaging the underside of said rim, and at least one strap integral with said ring, said at least one strap being securable to define a single carrying handle looping from a first location on said ring, thence upwardly, across and down to a second location 180 degrees from said first location on said ring.

9. A plant pot carrier as recited in claim 8, in which said flange means comprises at least three radially spaced tabs projecting inwardly from said ring.

10. A plant pot carrier as recited inclaim 8, further comprising at least two integral radially spaced inwardly directed tabs projecting from said upper edge of said wall for engaging an upper surface of said rim.

11. A plant pot carrier as recited in claim 8, further comprising at least two integral radially spaced inwardly directed tabs at the upper edge of said wall for engaging an upper surface of said rim.

12. A plant pot carrier as recited in claim 8, in which said flange means comprises a continuous flange at said lower edge of said ring.

13. A plant pot carrier as recited in claim 8, in which said at least one strap comprises two straps projecting from opposite sides of said ring, said straps having complementary fastening means for fastening to each other to form said carrying handle.

14. A plant pot carrier as recited in claim 13, in which a first one of said two straps has a plurality of T-shaped apertures comprising a transverse top portion and a longer base portion, and in which the second one of said two straps has at least one neck area narrower than adjacent areas of said strap, where said second one of said two straps in insertable in said base portion of one of said T-shaped apertures, and is rotatable so as to position one of said at least one neck areas in said transverse top portion thereof, said strap adjacent said neck area being greater in width than said transverse top portion of said T-shaped aperture, whereby said second one of said two straps is anchorable in said first one of said two straps.

15. A plant pot carrier as recited in claim 13, in which said straps are adapted to lie ordinarily in the same plane as said ring, but are each connected to said ring via an integral living hinge comprising an area of reduced strap thickness immediately adjacent a junction between said straps and said ring, whereby said straps are readily deformable to form said carrying handle.

16. A plant pot carrier as recited in claim 14, in which said straps are adapted to lie ordinarily in the same plane as said ring, but are each connected to said ring via an integral living hinge comprising an area of reduced strap thickness immediately adjacent a junction between said straps and said ring, whereby said straps are readily deformable to form said carrying handle.

17. A plant pot carrier as recited in claim 8, in which said at least one strap comprises a single strap projecting from a first location on one side of said ring, passable across to and fastenable to a location on said ring 180 degrees from said first location to form said carrying handle.

18. A plant pot carrier as recited in claim 17, in which said strap is adapted to lie ordinarily in the same plane as said ring, but is connected to said ring via an integral living hinge comprising an area of reduce strap thickness immediately adjacent a junction between said strap and said ring, whereby said strap is readily deformable to form said carrying handle.

* * * * *